Oct. 10, 1961  G. GLUCHOWICZ  3,003,293
MACHINE FOR GRINDING WORKPIECES TO NARROW TOLERANCES
Filed July 11, 1955  3 Sheets-Sheet 1

Gerszon Gluchowicz
By:
*B. E. Shlesinger*
Attorney

Oct. 10, 1961 G. GLUCHOWICZ 3,003,293
MACHINE FOR GRINDING WORKPIECES TO NARROW TOLERANCES
Filed July 11, 1955 3 Sheets-Sheet 2
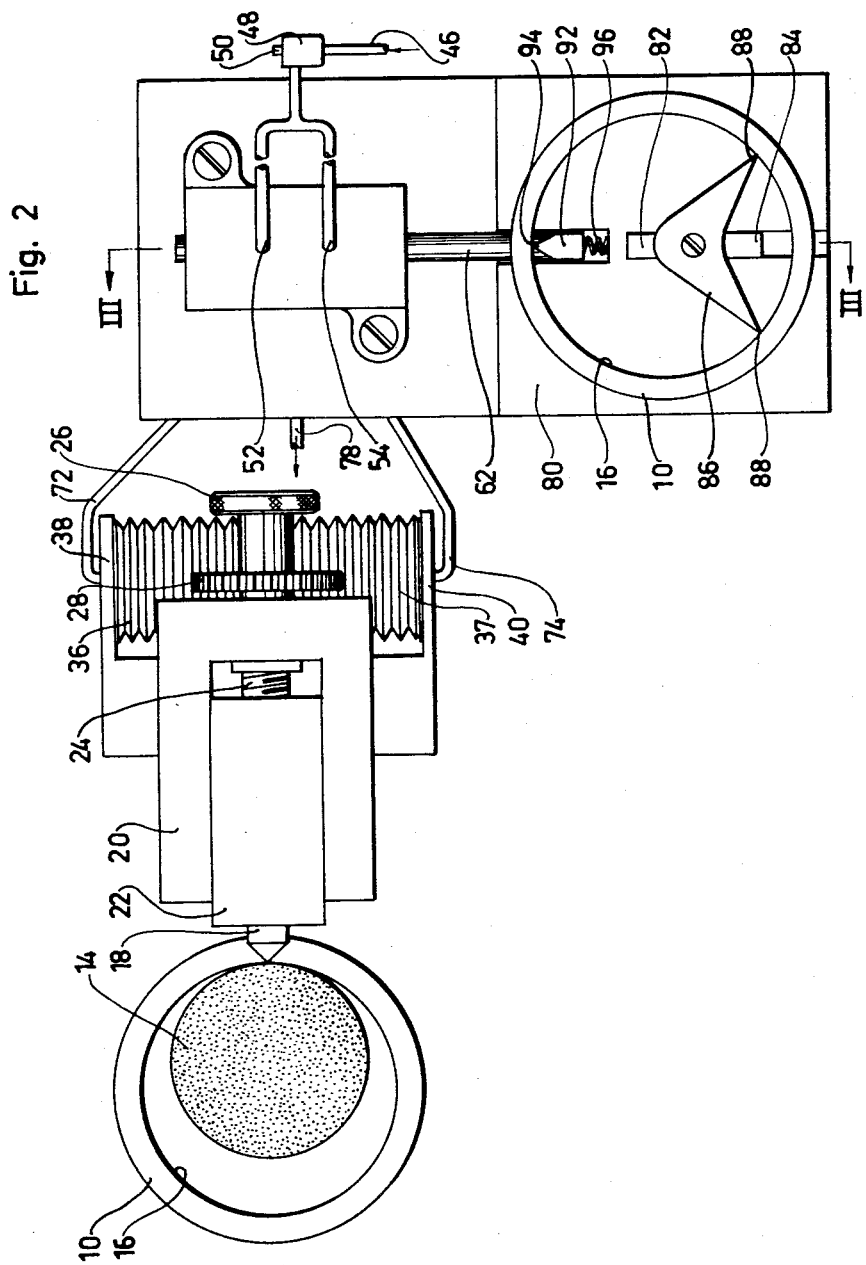
Gerszon Gluchowicz
By: *[signature]*
Attorney

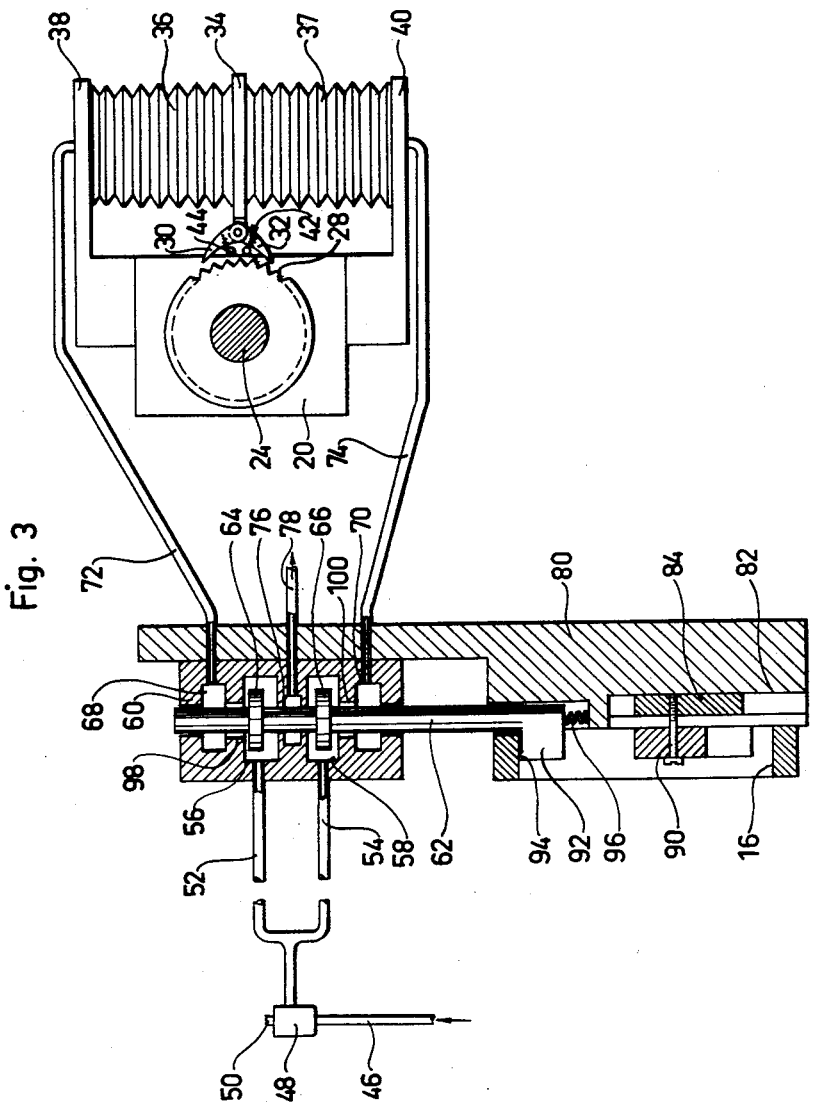

United States Patent Office 3,003,293
Patented Oct. 10, 1961

3,003,293
MACHINE FOR GRINDING WORKPIECES TO NARROW TOLERANCES
Gerszon Gluchowicz, Hagersten, Sweden, assignor to Ulvsunda Verkstäder Aktiebolag, Bromma, Sweden, a corporation of Sweden
Filed July 11, 1955, Ser. No. 521,281
Claims priority, application Sweden July 12, 1954
5 Claims. (Cl. 51—165)

This invention relates to grinding machines.

More particularly this invention relates to a means for grinding workpieces to narrow tolerances in the mass production of such workpieces.

In the mass production of workpieces by grinding machines within narrow tolerances, various methods are utilised for continuous supervision of the working dimensions. According to one method, which is applied to the grinding of cylindrical bores, a gauge is employed which follows the grinding disc during the reciprocating movement of the latter over the table. As long as the diameter of the surface subjected to grinding is too small, the gauge cannot enter, but when the proper diameter is reached, the gauge will enter the ground hole while at the same time actuating the driving members of the machine so that the grinding spindle is brought to a standstill. This method is restricted to certain forms of the workpiece and, moreover, the gauge is rapidly worn down, for which reason the method is comparatively expensive to use.

It is also known to apply a feeling member against the working surface, which member brings the machine to a stanstill when the proper dimension has been reached. This construction is also limited to certain forms of the workpiece, and is comparatively complicated.

A third method has also been employed involving an adjustment of the diameter of the grinding disc according to the desired working dimension of the workpiece and this method is illustrated in FIG. 1 of the accompanying drawings. In this figure, 10 designates the workpiece set up in a chuck 11 carried by a work support 13 and operated on by a grinding disc 14 carried by a grinding spindle 12. The grinding spindle is journaled in a tool support 15 which is in general movable back and forth as well as radially for operating on the inner cylindrical surface 16 of the workpiece. This surface is to be ground to the radius R plus K. In the first stage of the grinding operation, the grinding disc is fed radially outwards during its reciprocating movement in the workpiece, until the radius of the hole of the workpiece is somewhat greater than R but smaller than the ultimate dimension, at which time a control member actuates the table and the grinding disc is moved axially out from the workpiece.

A dressing tool 18, having its diamond point adjusted to the radius R, is employed for the requisite dressing of the grinding disc so as to maintain the dimension R at the portion of the circumference of the disc which is farthest away from the centre line of the surface 16. Then the grinding operation is continued, the grinding disc moving outwardly by the predetermined distance K, when the machine is brought to a standstill and the operation on the workpiece is completed.

The adjustment of the diamond to the radius R is effected manually. However, the location of the diamond is not constant but varies inter alia with the temperature distribution through the machine, said distribution varying, for instance, during the course of a working day. Moreover, wear of the diamond point contributes to the failure of the working surface of the grinding disc to maintain the distance R, the net result being that the diamond point deviates in both directions by the distance $dR$ shown in the figure. As a result this method cannot be employed when the demands for accuracy are very exacting.

One main object of the invention is to provide an improved means for adjustment based on the method last described.

A further object of the invention is to provide a grinding machine having the grinding surface of a rotatable grinding disc dressed by means of a dressing tool to a constant position relatively to the workpiece in the grinding position of the latter which includes means, adapted to adjust the position of a dressing tool.

Further objects and advantages of the invention will be apparent from the following description considered in connection with the accompanying drawing which forms part of this specification and of which:

FIG. 1 as mentioned above shows diagrammatically the principle of adjustment of the dimensions by dressing of the grinding disc.

FIG. 2 shows in elevation a device adapted for automatically carrying the method of the present invention into operation.

FIG. 3 shows the same device, partly in section, on the line III—III in FIG. 2.

Figure 4:
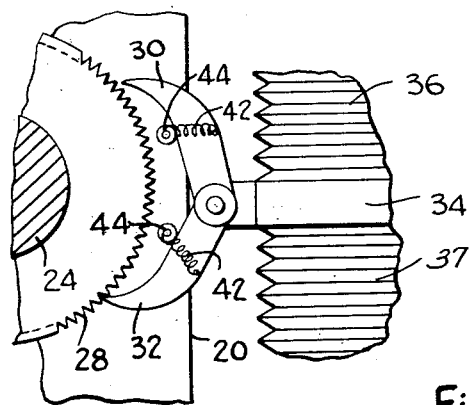
FIG. 4 is a fragmentary detail view showing on a somewhat larger scale than FIG. 3 the ratchet and pawl mechanism for effecting adjustment of the dressing diamond.
Figure 1:
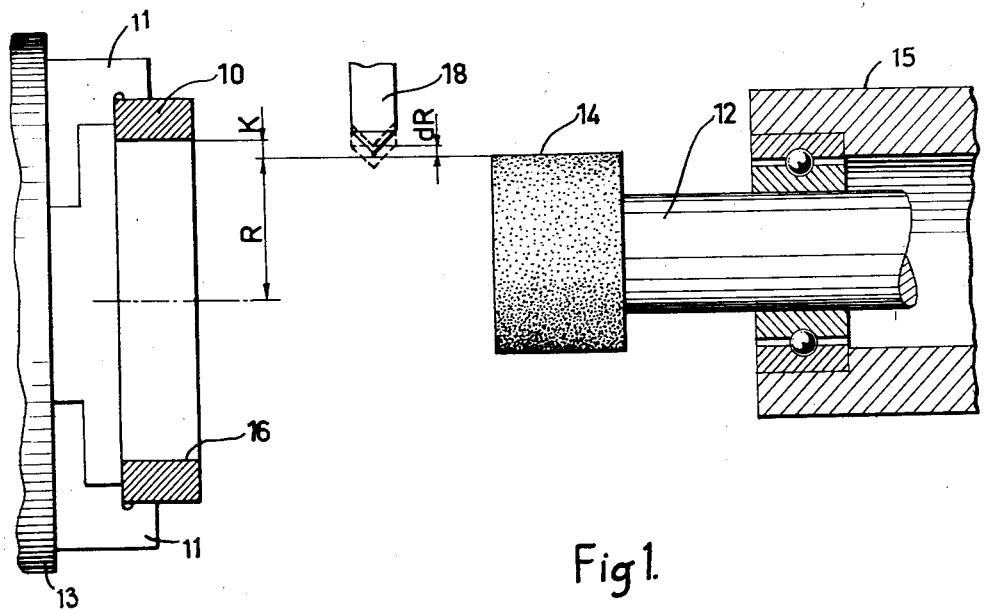

In FIGS. 2 and 3, 20 designates a frame provided with guide surface for a slide 22 rigidly connected to the diamond tool 18 and displaceable by means of a screw 24 threaded into the frame. The screw has an operating head 26 for manual adjustment of the initial position of the diamond tool. The screw also carries a toothed wheel 28 adapted to be rotated in one or the other direction by pawls 30, 32, (FIGS. 3 and 4) pivotally mounted on an intermediate member 34 of a differential pressure gauge. The gauge is provided with two bellows 36, 37 carrying the intermediate member 34 and forming, together with the latter, two separate chambers.

The outer ends of the bellows are sealed against head pieces 38 and 40 of the frame 20. A spring 42 acts on each pawl 30, 32 to move the respective pawl against the wheel 28 into engagement with the teeth thereof. When one pawl moves into engagement, the other pawl engages a fixed stop member 44, which is carried by the frame 20, as will be described more fully hereinafter. These members serve as an example of one possible arrangement of the servo-motor of the device. The springs 42 connect the pawls 30 and 32 to the stops 44.

A medium under constant pressure, such as oil or air, is supplied through a conduit 46 having a valve 48 arranged therein, said valve being provided with a manipulating button 50. The conduit 46 is divided into two branches 52 and 54 opening respectively into chambers 56, 58, in a housing 60. A spindle 62 carries plungers 64 and 66 within the respective chambers 56 and 58. Located in the housing axially beyond said chambers are two further chambers 68, 70, each connected through a conduit 72 and 74 respectively to the chambers of the bellows 36, 37 of the servo-motor. An additional chamber 76 is provided between the chambers 56 and 58 and communicates with an outlet conduit 78.

The housing 60 is rigidly connected to a base member 80 formed with a T-shaped groove 82 in which runs a slide shoe 84. A triangular-shaped element 86 having two pointed ends 88 is secured to the shoe 84 by means of a screw 90 and together with the shoe may be adjusted and locked relatively to the base in various vertical positions along the axis of the spindle 62. The latter is provided with a projection 92 having a point 94. The workpiece 10 is intended to be applied to the base so that the points 88 and 94 are caused to bear on the inner surface 16 thereof. A spring 96 moves the spindle 62 in an upward direction and thus brings the point 94 into contact with the workpiece.

After the grinding of the inner surface 16 of a workpiece 10 has been completed, the workpiece is placed in the measuring contrivance above described. Then the button 50 is depressed, so that air or other fluid under pressure is caused to flow in through the conduits 52, 54. A small amount of air leaks between the housing 60 and the spindle into the chamber 76 and through the outlet 78. Another part of the air passes through the clearances 98 and 100, respectively, between the housing and the spindle into the chambers 68 and 70, the two chambers of the bellows being thus subjected to pressure. At the same time air will gradually leak out through the throttling clearances between the spindle and the housing 60 on the outside of the two chambers. If the diameter of the surface 16, that is, the correct bore size has been accurately ground, the plungers 64, 66 will take a middle position, and due to the fact that the pressure in the chambers of the bellows will be at the same value, nothing further results.

However, if the diameter of the bore is too large, the spindle 62 will have to be displaced upwardly according to the figures, in order to bring the point 94 thereof into contact with the inner surface of the workpiece. Thus the clearance between the plunger 64 and the upper end wall of the chamber 56 becomes smaller than previously, while the clearance between the plunger 66 and the lower end wall of the chamber 58 increases to the same extent, as indicated in FIG. 3. The pressure differential between the chambers 56 and 58 thus increases, the pressure in the chamber 68 becoming lower than that in chamber 70, so that as a result a higher pressure will act upon the lower side of the intermediate member 34. The intermediate member 34 is thus displaced upwardly, and the pawl 30 engages a tooth of the wheel 26 to turn the latter through a small angle. The pawl 32, on the other hand, will have moved against the stop member 44 and will be rendered inoperative. The movement of the toothed wheel is transmitted to the screw 24, and the diamond tool 18 is moved by a predetermined amount towards the grinding disc 14.

The magnitude of the displacement of the intermediate member 34 is dependent on the pressure differential on the two sides thereof, which in turn is determined by the location of the spindle 62 relatively to the housing 60. A correction of the dimension R has thus been effected, so that the next workpiece will have the correct dimension.

On the other hand, should the diameter of the bore be too small, excess pressure is built up above the intermediate member 34, which is thus moved downwardly by said pressure. The pawl 32 (FIGS. 3 and 4) now becomes operative, whereas the pawl 30 is inoperative. After each adjustment the air supply through the valve 48 is interrupted, before the workpiece is removed from the measuring device, so that the bellows 37 and 38 are relieved of pressure. After the workpiece has been removed from the measuring device, the spindle 62 will be moved by the spring 96 to its extreme upper position wherein the plunger 64 thereof bears against the housing 60.

While one more or less specific embodiment of the invention has been shown and described, it is to be understood that this is for purpose of illustration only and that the invention is not to be limited thereby, but its scope is to be determined by the appended claims.

What I claim is:

1. The combination in a grinding machine having a tool support, a work support, a rotary grinding wheel rotatably mounted on said tool support, a dressing tool for dressing the active surface of the grinding wheel, means mounting said dressing tool for adjustment relative to said grinding wheel to determine the position of the active surface of said wheel, and adjusting means for effecting said adjustment, of a measuring device for measuring a dimension of the workpiece after it has been ground on the machine, and means connecting said measuring device to said adjusting means to move said adjusting means a varying amount corresponding to the deviation of the dimension of the workpiece from a predetermined dimension as measured by said measuring device.

2. In a machine tool having an adjustable member for determining a dimension to be produced on a workpiece, and means for adjusting said member to predetermine said dimension, a measuring device for measuring said dimension of a workpiece after operation on the workpiece has been completed on the machine tool, a movable valve, means connecting said valve to said measuring device to move said valve an amount corresponding to the deviation of said dimension of the workpiece measured by said measuring device from a predetermined dimension, fluid-pressure operated means controlled by said valve, and means operatively connecting said fluid-pressure operated means to said adjusting means to adjust said adjusting means in accordance with the amount of movement of said valve.

3. In a machine tool having an adjustable member for determining a dimension to be produced on a workpiece, and means for adjusting said member to predetermine said dimension, a measuring device for measuring the said dimension of a workpiece after operation on the workpiece has been completed on the machine tool, a movable valve, movable fluid-pressure operated means operatively connected to said adjusting means to effect movement of said adjustable member in proportion to the movement of said fluid-pressure operated means and in a direction determined by the direction of movement of said fluid-pressure operated means, and means controlled by said valve for applying different pressures to opposite sides of said fluid-pressure operated means to determine the direction and amount of movement of said fluid-pressure operated means depending upon the direction and amount of movement of said valve, and means operatively connecting said valve to said measuring device to move said valve an amount and in a direction determined by the deviation of the said dimension of a workpiece measured by said measuring device from a predetermined dimension.

4. The combination in a grinding machine having a work support, a tool support, a rotary grinding wheel rotatably mounted on the tool support, a dressing tool for dressing the wheel, and means for movably mounting said dressing tool to move said dressing tool into operative relation with the wheel, of a support for holding a workpiece after it has been removed from the work support, a measuring device for said workpiece responsive to deviations from a predetermined dimension of the workpiece, said measuring device comprising a movable member, and spring means for constantly urging said movable member in one direction, fluid-pressure operated means for moving said movable mounting means in opposite directions, a movable valve for determining the direction of application of fluid pressure to said fluid-pressure operated means to determine the direction of movement of said movable mounting means, and means connecting said movable member to said valve to move said valve in response to deviations from said predetermined dimension of the workpiece.

5. The combination in a grinding machine as claimed in claim 4, wherein the means for moving said movable mounting means comprises a screw, a ratchet wheel secured to said screw, two pawls engageable with said ratchet wheel to move said ratchet wheel in opposite directions respectively, an actuating member movable in opposite directions to actuate, respectively, said pawls, a pair of bellows, each of said bellows being connected at one end to said actuating member and being fixed at its opposite end, and means for applying fluid pressure selectively to one of said bellows under control of said valve.

References Cited in the file of this patent

UNITED STATES PATENTS

| | | |
|---|---|---|
| 1,036,544 | Bath | Aug. 27, 1912 |
| 1,954,442 | Dall | Apr. 10, 1934 |
| 2,042,257 | Harrison | May 26, 1936 |
| 2,275,141 | Gurney | Mar. 3, 1942 |
| 2,280,692 | Elberty | Apr. 21, 1942 |
| 2,382,215 | Elberty | Aug. 14, 1945 |
| 2,459,641 | Hallead | Jan. 18, 1949 |